(12) United States Patent
Fukuda

(10) Patent No.: US 8,850,928 B2
(45) Date of Patent: Oct. 7, 2014

(54) POWER TAKEOFF UNIT FOR AUTOMOBILE

(75) Inventor: Hiromichi Fukuda, Tochigi (JP)

(73) Assignee: GKN Driveline Japan Ltd., Tochigi (JP)

( * ) Notice: Subject to any disclaimer, the term of this patent is extended or adjusted under 35 U.S.C. 154(b) by 169 days.

(21) Appl. No.: 13/598,519

(22) Filed: Aug. 29, 2012

(65) Prior Publication Data

US 2013/0055833 A1    Mar. 7, 2013

(30) Foreign Application Priority Data

Sep. 2, 2011 (JP) ................. 2011-191597
Aug. 9, 2012 (JP) ................. 2012-176741

(51) Int. Cl.
- *F16H 37/06* (2006.01)
- *B60K 17/346* (2006.01)
- *B60K 17/35* (2006.01)
- *F16H 1/14* (2006.01)

(52) U.S. Cl.
CPC ............. *B60K 17/3462* (2013.01); *F16H 1/14* (2013.01); *B60K 17/35* (2013.01)
USPC ................................... 74/665 GB

(58) Field of Classification Search
USPC .............. 74/665 GB, 665 H, 665 T
See application file for complete search history.

(56) References Cited

U.S. PATENT DOCUMENTS

| 4,643,045 A * | 2/1987 | Katayama ............... 475/198 |
| 4,697,470 A * | 10/1987 | Sasaki et al. ............ 475/206 |
| 4,867,001 A * | 9/1989 | Sasaki et al. ............ 74/424 |
| 2011/0179906 A1 * | 7/2011 | Juenemann et al. ...... 74/665 F |

FOREIGN PATENT DOCUMENTS

| JP | 2009-269605 A | 11/2009 |
| JP | 2009-292307 A | 12/2009 |

\* cited by examiner

*Primary Examiner* — Ha D Ho
(74) *Attorney, Agent, or Firm* — Bejin Bieneman PLC

(57) ABSTRACT

A power takeoff unit transmits torque taken from a transmission of a vehicle to an output shaft. The power takeoff unit is comprised of a casing combinable with the transmission at a first end; a first shaft receiving the torque about a first axis; a second shaft rotatable about the first axis; a clutch slidably fitting with the second shaft and being directed to the first shaft, the clutch being movable along the first axis between a first position to interrupt transmission of the torque and a second position to transmit the torque from the first shaft to the second shaft; a first gear projecting from the bearing toward the first end and being rotatable along with the second shaft without any support excepting the bearing; and a third shaft including a second gear meshing with the first gear, thereby outputting the transmitted torque.

7 Claims, 4 Drawing Sheets

POWER TAKEOFF UNIT FOR AUTOMOBILE

CROSS-REFERENCE TO RELATED APPLICATIONS

This application is based upon and claims the benefit of priority from the prior Japanese Patent Applications No. 2011-191597 (filed Sep. 2, 2011) and No. 2012-176741 (filed Aug. 9, 2012); the entire contents of which are incorporated herein by reference.

BACKGROUND OF THE INVENTION

1. Field of the Invention

The present invention relates to a power transmission device of an automobile, and in particular relates to a power takeoff unit for distributing torque from first axles to second axles in a four-wheel drive vehicle for example.

2. Description of the Related Art

In a front-wheel drive vehicle for example, an engine installed on the front of a vehicle body generates torque and a transmission receives and distributes the torque to left and right front wheels via a differential. A four-wheel drive vehicle in general employs a power takeoff unit (PTU), in combination with such a transmission, for distributing part of the torque to rear wheels.

A PTU converts torque about an input shaft extending in a lateral direction relative to a vehicle body into torque about an output shaft extending in a lengthwise direction. The output shaft is drivingly coupled with a propeller shaft through which the torque is transmitted to the rear wheels.

To realize part-time four-wheel driving, a device for controllably permitting/interrupting torque transmission is often used on the transmission path of the torque. It is beneficial to interrupt torque transmission at a point upstream of a heavy propeller shaft in light of reduction of energy consumption. Thus the device for permitting/interrupting torque transmission is preferably installed in the PTU. This may lead to size-grow of the PTU.

As a PTU is in general disposed in parallel with a transmission, its output shaft inevitably laterally deviates (offsets) from a center of a vehicle body, and therefore a propeller shaft coupled therewith accordingly makes an offset. It is preferable that loads and forces acting on the vehicle body are symmetric. Therefore, the offset of the propeller shaft is unfavorable because the propeller shaft is relatively heavy and elongated in the lengthwise direction of the vehicle body although it is given torque. More specifically, the offset of the output shaft of the PTU as well as the propeller shaft has been a long-felt but unresolved technical problem.

Japanese Patent Applications Laid-open No. 2009-269605 and No. 2009-292307 disclose related arts.

SUMMARY OF THE INVENTION

The present invention is intended to provide a compact PTU capable of controlling torque transmission, which reduces an offset of an output shaft and a propeller shaft as well.

According to an aspect of the present invention, a power takeoff unit for transmitting torque taken from a transmission of a vehicle is comprised of: a casing having a first end, a second end opposed to the first end, a first axis running from the first end to the second end, and a second axis not parallel to the first axis, the casing combinable with the transmission at the first end; a first shaft supported by the casing and rotatable about the first axis, the first shaft being so coupled with the transmission to receive the torque; a second shaft supported by a bearing on the casing at the second end and rotatable about the first axis; a clutch slidably fitting with the second shaft and being directed to the first shaft, the clutch being rotatable along with the second shaft and movable along the first axis between a first position to interrupt transmission of the torque and a second position to mesh with the first shaft to transmit the torque from the first shaft to the second shaft; a first gear projecting from the bearing toward the first end and rotating along with the second shaft without any support excepting the bearing; and a third shaft rotatable about the second shaft, the third shaft including a second gear meshing with the first gear.

DETAILED DESCRIPTION OF THE PREFERRED EMBODIMENT

Certain embodiments of the present invention will be described hereinafter with reference to the appended drawings.

Figure 4:
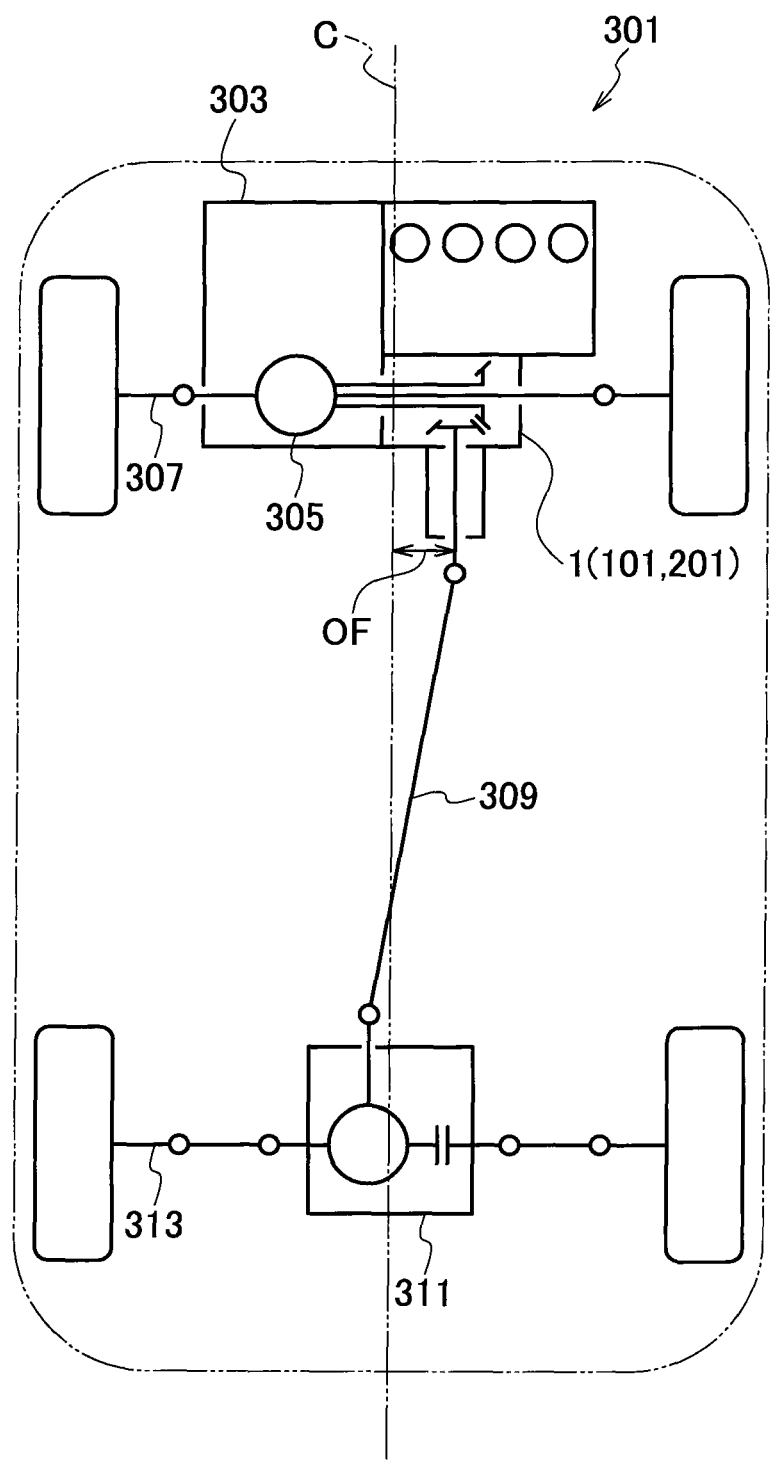
FIG. 4 is a schematic drawing of a four-wheel driving vehicle to which any of the power takeoff units is applied.

Referring to FIG. 4, a power takeoff unit 1 (alternatively, 101 or 201) of any of the embodiments is preferably applicable to a part-time four-wheel driving vehicle 301 for example. Torque generated by an engine, or a combination of an electric motor and an engine, is transmitted to a transmission 303 and distributed to left and right front axles 307 via a front differential 305 in the transmission 303. The power takeoff unit 1 (101, 201) receives and transmits part of the torque to a propeller shaft 309 and further to a rear differential 311, which distributes the part of the torque to left and right rear axles 313. The embodiments described below can reduce an offset OF of an output shaft of the power takeoff unit 1 (101, 201) relative to a center C of a vehicle body while it can controllably interrupt torque transmission to the rear wheels.

Figure 1:
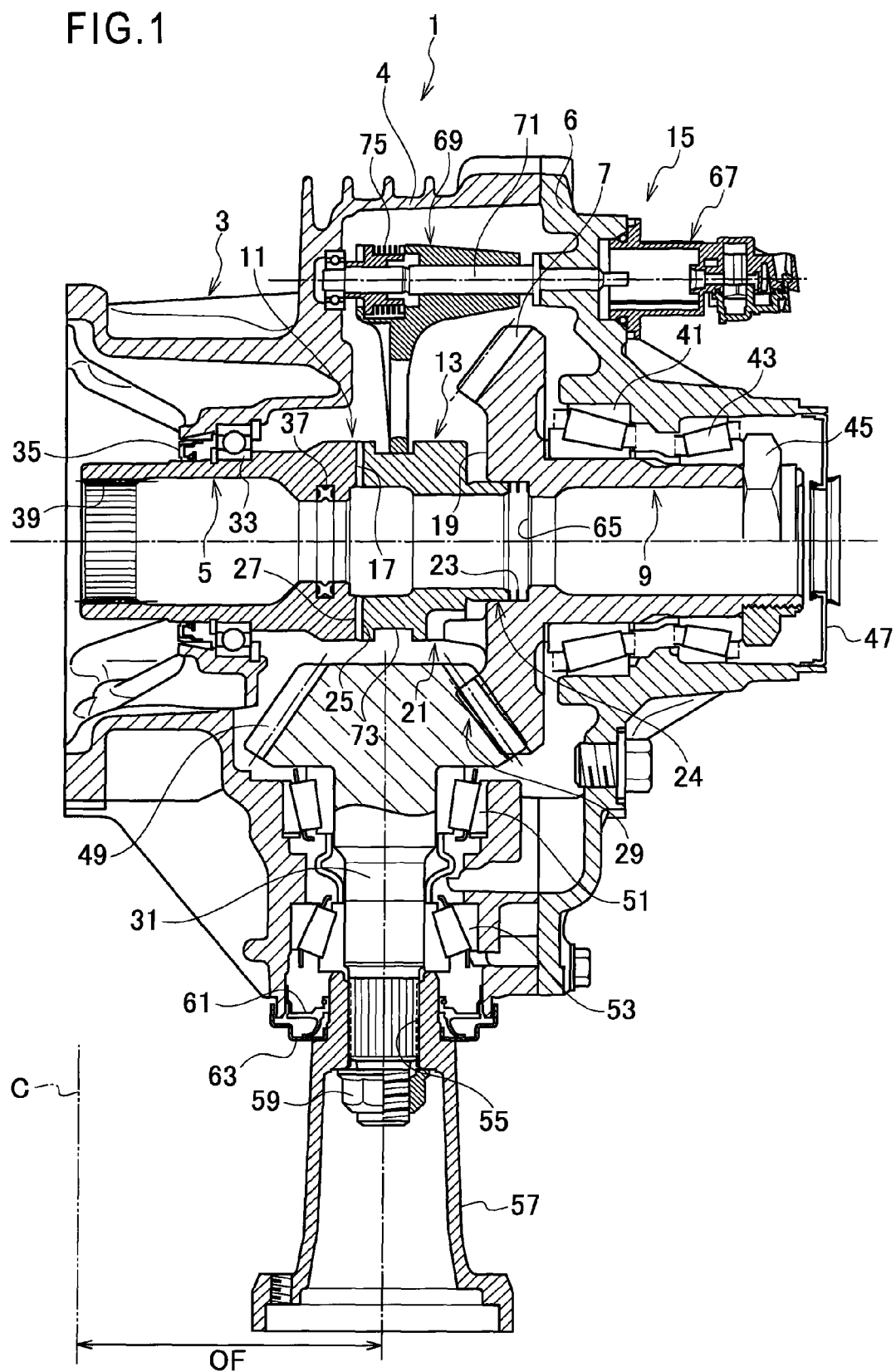
FIG. 1 is a sectional plan view of a power takeoff unit according to a first embodiment of the present invention.

Referring to FIG. 1, a power takeoff unit 1 according to a first embodiment is comprised of a casing 3, a first shaft 5 rotatably supported by the casing 3 at a first end thereof for receiving torque input, a second shaft 9 rotatably supported by the casing 3 at a second end (opposed to the first end) thereof, and a clutch 13 for controllably permitting/interrupting torque transmission therebetween. The second shaft 9 has a ring gear 7, as a first gear. The power takeoff unit 1 is further comprised of a third shaft 31 having a pinion 49, as a second gear, meshing with the ring gear 7, thereby outputting the transmitted torque.

The casing 3 has a first end (left end) so structured as to be combinable with the transmission 303 and a second end (right end) opposed to the first end. About a first axis running from the first end to the second end, shown as a lateral dashed line in FIG. 1, the first shaft 5 and the second shaft 9 are made rotatable.

The first shaft 5 toward the first end has an end for input that has an opening with splines 39, which are combinable with splines of an output shaft of the transmission 303. The first shaft 5 has an end 17 opposed to the input end, namely toward the second end, which is used for torque transmission to the second shaft 9.

The second shaft 9 accordingly has an end 19 for receiving the torque. The clutch 13 is interposed between the ends 17, 19, and is slidably fitted in the second shaft 9 at part 24. For this fitting, a circular recess 65 may be provided in the second shaft 9. Therefore the clutch 13 is axially movable along the first axis and is also radially centered relative to the second shaft 9.

Between the clutch 13 and the second shaft 9 formed is a coupling portion 21 for drivingly coupling the clutch 13 with the second shaft 9, thereby the clutch 13 and the second shaft 9 unitarily rotate. The coupling portion 21 may be meshing teeth, or a combination of protrusions and dents meshing each other, respectively formed on the clutch 13 and the second shaft 9. More preferably, the meshing teeth, or the combination of protrusions and dents, have slanted side faces to form a cam to convert the torque in part into an axial force that biases the clutch leftward.

Between the clutch 13 and the second shaft 9 repulsively interposed is a bias means such as a coil spring 23 to bias the clutch leftward. As relative rotation between the clutch 13 and the second shaft 9 does not occur, the coil spring 23 is free from severe friction caused by relative rotation.

On the end face 17 of the first shaft 5 formed are first clutch teeth 25, and on an end face of the clutch 13 opposed thereto formed are second clutch teeth 27. These clutch teeth in combination form an engaging portion 11 that, when meshing, transmits the torque from the first shaft 5 to the clutch 13.

The casing 3 is secured to the vehicle body via any intervening members. The casing 3 is formed of disintegrable several components such as a main body 4 and a cover 6. All the internal parts such as those described above are installed in the casing 3 and then the disintegrated components are assembled to set up the casing 3.

The first shaft 5 is rotatably supported by the casing 3 at the first end, or the main body 4 for example, via a bearing 33. To the bearing 33 preferably applicable is a four-point contact bearing that establishes four contacts on the outer periphery of first shaft 5. Therefore the bearing 33 establishes stable support of the first shaft 5. Alternatively to the bearing 33 applicable are paired bearings to establish axially separated two contacts. Further in between the first shaft 5 and the casing 3 interposed is a sealing member 35 for sealing oil within the casing 3.

The second shaft 9 is rotatably supported by the casing 3 at the second end, or the cover 6 for example, via paired conical bearings 41, 43. The first shaft 5 and the second shaft 9 are coaxial with the first axis. The paired conical bearings 41, 43 can bear not only the radial load on the second shaft 9 but also the thrust load thereon. The second shaft 9 may have a nut 45 for giving axial pressure to the bearings 41, 43 and regulating axial displacement of the second shaft 9.

The ring gear 7 of the second shaft 9 and the pinion 49 of the third shaft 31 form a direction-change gear set 29 of a bevel-gear type for changing rotation axes from the first axis to a second axis not parallel to the first axis. The second axis is shown as a vertical dashed line in FIG. 1. Further, the gear set 29 also functions as a speed-change (reduction or accelerating) gear in accordance with a gear ratio between the ring gear 7 and the pinion 49.

The ring gear 7 is configured to rotate along with the second shaft 9 and may be formed in a unitary body with the second shaft 9. Further the ring gear 7 projects leftward (toward the first end) out of the paired bearings 41, 43 and is further not supported by any bearings excepting the bearings 41, 43. More specifically, the ring gear 7 is disposed most leftward among the components related to the second shaft 9. Whereas the ring gear 7 is projecting and receives an off-centered load from the pinion 49, both eccentric motion and precession of the shaft 9 can be prevented because the paired conical bearings 41, 43 bear not only the radial load but also the thrust load as described above.

The pinion 49 is so structured as to rotate along with, and preferably formed in a unitary body with, the third shaft 31. Thus the torque transmitted via the gear set 29 is transmitted to the third shaft 31. As the pinion 49 is disposed at the left of the ring gear 7 close to the left end to mesh with the ring gear 7, the axial center of the pinion 49 gets closer to the left end (first end) of the casing 3 and therefore gets closer to the center C of the vehicle body. Therefore the offset OF is reduced.

The third shaft 31 is also rotatably supported by the casing 3, or the main body 4, via paired conical bearings 51, 53. The third shaft 31 has a splined end 55, by which a coupling member 57 for coupling with a propeller shaft 309 is coupled with the third shaft 31.

The third shaft 31 may have a nut 59 for giving axial pressure to the bearings 51, 53 and also securing the coupling member 57 with the third shaft 31.

In between the third shaft 31 and the casing 3 interposed is a sealing member 61 for sealing oil within the casing 3. Further preferably a dust cover 63 is provided thereon.

The first shaft 5, the clutch 13, and the second shaft 9 are formed as hollow cylinders to allow passage of an axle led out of the front differential 305. To seal gaps, one or more seal members 37 such as an X-ring may be provided on the internal peripheries thereof. Further in between the second shaft 9 and the casing 3 (cover 6) interposed is a sealing member 47 for sealing oil within the casing 3, which has an opening to allow passage of the axle.

To actuate the clutch 13, an actuator 15 is provided. The actuator 15 is comprised of an electric motor 67 and a shift fork 69. The motor 67 is secured to the casing 3, in particular to the cover 6, and exerts a force on the shift fork 69. The shift fork 69 is elongated to an engagement dent 73 on the clutch 13 and here drivingly engaged with the clutch 13. As being apparent from FIG. 1, the part where the shift fork 69 establishes engagement with the clutch 13 is closer to the first end of the casing 3 than the bearings 41, 43 and the ring gear 7. Any other proper means such as a hydraulic cylinder may be applicable instead of the motor 67, or the combination of the motor 67 and the spring 75.

A storing spring 75 may be provided on the shaft of the motor 67. The storing spring 75 can temporarily store the force by the motor 67 even when the clutch teeth 25, 27 cannot be in mesh, and thereafter release the stored force to mesh the first clutch teeth 25 with the second clutch teeth 27.

When the actuator 15 drives the shift fork 69 rightward, the clutch 13 comes into a first position where the clutch teeth 25, 27 of the engaging portion 11 are disengaged and therefore transmission of the torque to the second shaft 9 is interrupted. When the actuator 15 drives the shift fork 69 leftward, the clutch 13 comes into a second position where the clutch teeth 25, 27 come into mesh and therefore the torque is transmitted from the first shaft 5 to the second shaft 9.

Then the biasing forces by the cam of the coupling portion 21 and the coil spring 23 assist the clutch 13 to keep the meshing state. Further, without the force exerted by the actuator 15, the clutch 13 is naturally in the second position (meshing) because of these biasing forces.

The engaging portion 11 is inherently disposed between the first shaft 5 and the second shaft 9. As torque transmission is interrupted here, the torque input from the transmission 303 is not exhausted by rotating not only the propeller shaft 309 but also any of the second shaft 9, the change-direction gear set 29, and the third shaft 31. Therefore the present embodiment can reduce energy consumption. In a PTU of the prior art, this part was wasted for elongation of an input shaft. In contrast this part in the present embodiment is used for disposition of the engaging portion 11 and the shift fork 69 and therefore any additional space for them is not required. This is beneficial in realizing a compact PTU.

Further, the present embodiment ensures a sufficient length for travel of the clutch 13 although the PTU is so compact, because the space between the first shaft 5 and the second shaft 9 is used. It leads to nearly hitchless operation of the clutch 13.

As the cam and the coil spring 23 assist the clutch to keep the meshing state, the actuator 15 is not required to have a considerable driving ability to drive the clutch 13. This is also beneficial in energy consumption saving and size reduction.

Some modifications to the first embodiment will occur as described below.

Figure 2:
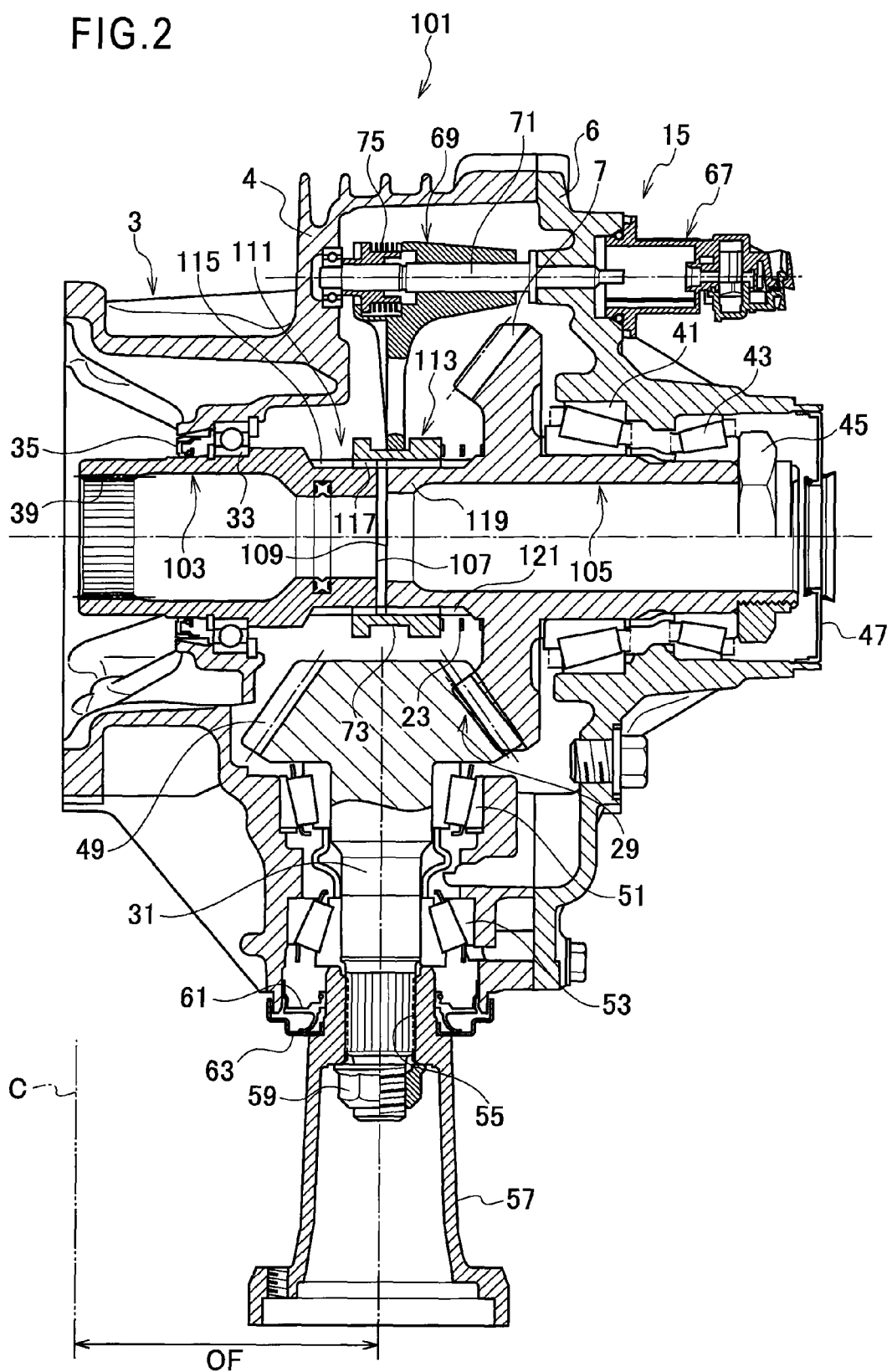
FIG. 2 is a sectional plan view of a power takeoff unit according to a second embodiment of the present invention.

Referring to FIG. 2, in a power takeoff unit 101 according to a second embodiment, an end 107 of a first shaft 103 for torque transmission is directly opposed to an end 109 of a second shaft 105. There may not be any intervening member between the end 107 and the end 109. As a boss portion 119 projecting from the ring gear 7 is elongated leftward (toward the first end), the end 109 at the top of the boss portion 119 is made close to the end 107.

On outer peripheries of the first shaft 103 and the second shaft 105 formed are splines 115, 121 in line. A clutch 113 is formed to be a hollow cylinder and its internal periphery has splines 117 engageable with the splines 115, 121. The clutch 113 fits on and is slidable along the first shaft 103 and the second shaft 105 with having the splines 117 engaged with the splines 115, 121.

These splines 115, 117 in combination form an engaging portion 111 that, when meshing, transmits the input torque from the first shaft 103 to the clutch 113. When the clutch 113 seats merely on the second shaft 105 (the first position), the splines 117 do not mesh with the splines 115 of the first shaft 103, thereby interrupting transmission of the input torque to the second shaft 105. In contrast, when the clutch 113 seats on both the first shaft 103 and the second shaft 105 (the second position), the splines 117 mesh with both the splines 115, 121. Then the input torque is transmitted from the first clutch 103 to the second clutch 105 via the clutch 113.

The actuator 15 actuates the clutch 113 as with the first embodiment. The coil spring 23 repulsively interposed between the clutch 113 and the second shaft 105 similarly exerts biasing force on the clutch 113 toward the second position as with the first embodiment.

The present embodiment also realizes a compact PTU with a reduced offset and improved energy efficiency as with the first embodiment.

Figure 3:
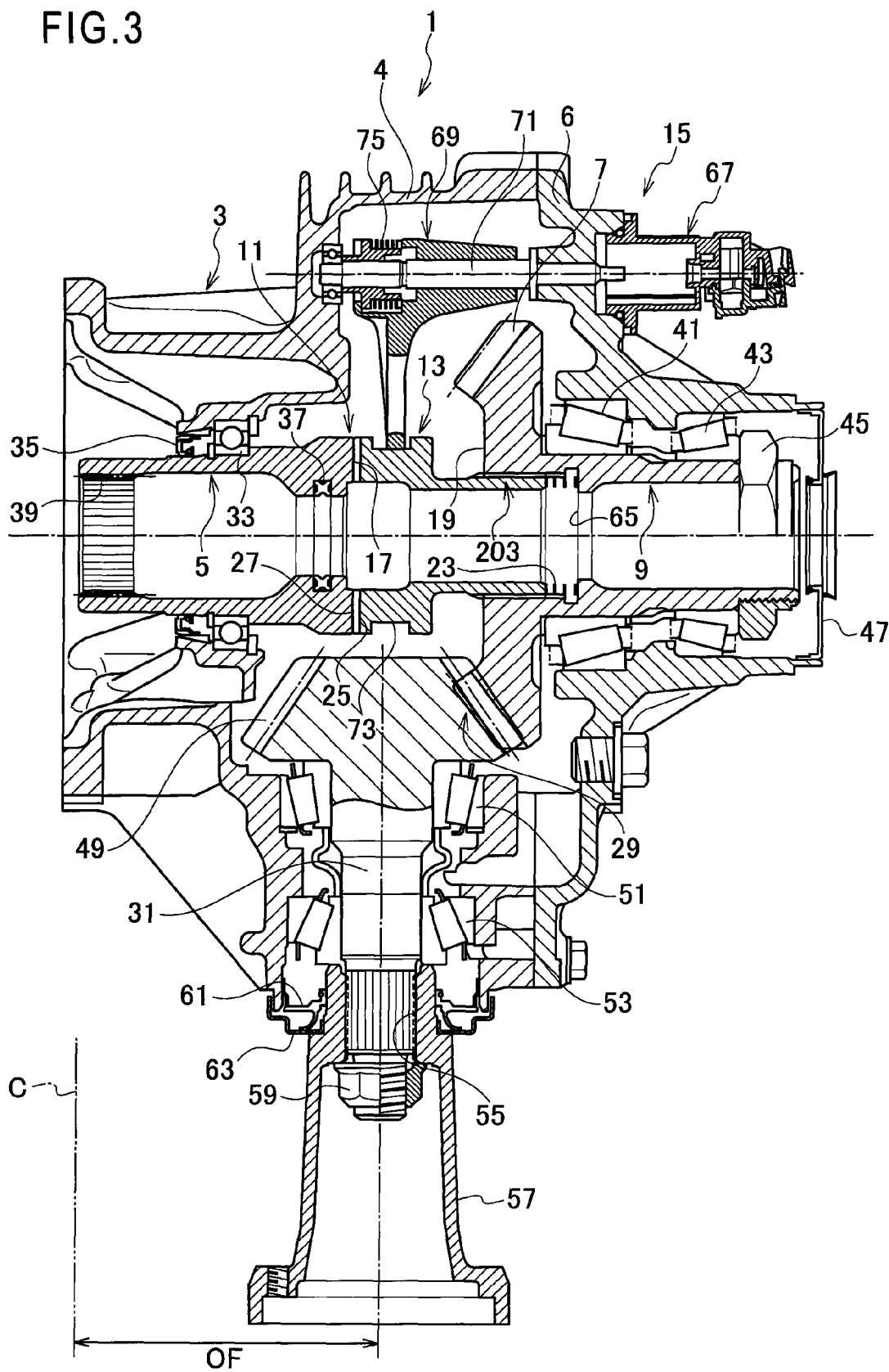
FIG. 3 is a sectional plan view of a power takeoff unit according to a third embodiment of the present invention.

Referring to FIG. 3, in a power takeoff unit 201 according to a third embodiment, the clutch 13 has a structure similar to that of the first embodiment but splines 203 formed on fitting portions of the clutch 13 and the second shaft 9 put the clutch 13 and the second shaft 9 into unitary rotation. Instead the coupling portion 21 with the cam function may be omitted.

Although assist by the cam function cannot be expected, the third embodiment can enjoy substantially the same effect as those of the first and second embodiments.

Although the clutch is drivingly coupled with the second shaft and is movable relative to the first shaft in any embodiments described above, the clutch may be coupled with the first shaft and made movable relative to the second shaft instead. Although the clutch steadily rotates along with the first shaft in such modifications, substantially the same effects are produced.

In the second embodiment described above, engagements among the first shaft 103, the second shaft 105 and the clutch 113 are all established by splines, however, teeth meshing or meshing between protrusions and dents may be instead applied any of them. For example, protrusions and dents may be respectively formed on the clutch 113 and the second shaft 105 thereby anti-rotate the clutch 113 relative to the second shaft 105 and instead the splines 121 on the second shaft 121 may be omitted. Even in this modification, substantially the same effects are produced.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A power takeoff unit for transmitting torque taken from a transmission of a vehicle, comprising:
   a casing having a first end, a second end opposed to the first end, a first axis running from the first end to the second end, and a second axis not parallel to the first axis, the casing combinable with the transmission at the first end;
   a first shaft supported by the casing and rotatable about the first axis, the first shaft being so coupled with the transmission to receive the torque;
   a second shaft supported by a bearing on the casing at the second end and rotatable about the first axis;
   a clutch slidably fitting with the second shaft and being directed to the first shaft, the clutch being rotatable along with the second shaft and movable along the first axis between a first position to interrupt transmission of the torque and a second position to mesh with the first shaft to transmit the torque from the first shaft to the second shaft;
   a first gear projecting from the bearing toward the first end and rotating along with the second shaft without any support excepting the bearing; and
   a third shaft rotatable about the second shaft, the third shaft including a second gear meshing with the first gear.

2. The power takeoff unit of claim 1, further comprising:
   an actuator including a shift fork drivingly engaged with the clutch at a point closer to the first end than the bearing and the first gear to drive the clutch.

3. The power takeoff unit of claim 1, wherein the first shaft comprises first clutch teeth and the clutch comprises second clutch teeth meshing with the first clutch teeth.

4. The power takeoff unit of claim 3, wherein the first clutch teeth are formed on an end face of the first shaft and the second clutch teeth are formed on an end face of the clutch opposed to the end face of the first clutch.

5. The power takeoff unit of claim 3, wherein the first clutch teeth and the second clutch teeth are splines extending along the first axis.

6. The power takeoff unit of claim 1, further comprising:
   a cam so formed on the second shaft to mesh with the clutch to bias the clutch toward the second position.

7. The power takeoff unit of claim 1, further comprising:
   a bias member repulsively interposed between the clutch and the second shaft to bias the clutch toward the second position.

* * * * *